United States Patent [19]

Gasper

[11] Patent Number: 4,481,414
[45] Date of Patent: Nov. 6, 1984

[54] LIGHT COLLECTION APPARATUS FOR A SCANNER

[75] Inventor: John Gasper, Hilton, N.Y.

[73] Assignee: Eastman Kodak Company, Rochester, N.Y.

[21] Appl. No.: 348,373

[22] Filed: Feb. 12, 1982

[51] Int. Cl.$^3$ .............................................. G01J 3/34
[52] U.S. Cl. .................................. 250/226; 350/171; 356/444
[58] Field of Search ................ 356/443, 444; 250/226, 250/227, 228, 216, 566, 568, 569, 570; 350/171, 173, 96.28

[56] References Cited

U.S. PATENT DOCUMENTS

| 1,825,781 | 10/1931 | Dawson. | |
|---|---|---|---|
| 2,865,245 | 12/1958 | Kelly | 350/171 |
| 2,947,810 | 8/1960 | Horsley | 178/6.7 |
| 3,202,039 | 8/1965 | deLang et al. | 88/1 |
| 3,585,281 | 6/1971 | Jordan | 350/171 |
| 3,647,946 | 3/1972 | Enloe | 350/171 |
| 3,761,184 | 9/1973 | McLaughlin, Jr. | 250/216 |
| 3,832,028 | 8/1974 | Kapron | 350/96 |
| 3,914,787 | 10/1975 | Sekiguchi | 350/171 |
| 4,045,133 | 8/1977 | Carlson | 350/96.28 |
| 4,105,332 | 8/1978 | Hohne et al. | 350/96.28 |
| 4,225,782 | 9/1980 | Kuppenheimer, Jr. | 250/226 |
| 4,240,692 | 12/1980 | Winston | 350/96.10 |

FOREIGN PATENT DOCUMENTS 1409153 10/1975 United Kingdom.

OTHER PUBLICATIONS

H. deLang and G. Bouwhuis, "Color Separation in Colour Television Cameras," *Philips Technical Review,* vol. 24, 1962/63, No. 9, pp. 263-271, Aug. 1963.
S. E. Glazer, "Taper Measurement Techniques," *Proc. of the Soc. of Photo-Optical Instrumentation Engineers,* vol. 31, 1972, pp. 13-22.
R. I. Seddon, "Interference Filters for Colorimetric Applications," *Proc. of the Soc. of Photo-Optical Engineers,* vol. 50, 1974, pp. 153-162.
P. M. van Alphen, "Applications of the Interference of Light in Thin Films," *Philips Technical Review,* vol. 19, 1957/58, No. 2, pp. 59-67.
H. van Ginkel, "Flying-Spot Scanners for Colour-Television," *Philips Technical Review,* vol. 21, 1959/60, No. 8, pp. 234-250.

*Primary Examiner*—David C. Nelms
*Attorney, Agent, or Firm*—David M. Woods

[57] ABSTRACT

In apparatus for scanning a transparent original with a scanning beam relative an optical axis, a tapered optical bar is positioned adjacent the transparent original to collect a diverging beam emerging from the original and, by means of internal reflection, reduce the divergence of the beam relative the optical axis. The emerging beam is especially diverged when the scanning beam sweeps away from the optical axis or is scattered by an artifact, such as a scratch, on the original. Particularly in the case of a polychromatic beam emerging from a color transparency, the tapered bar is interposed between the transparency and color dichroic beam separating mirrors to reduce angle shift and polarization color shading due to light rays diverging from the optical axis upon the dichroic interference layers.

13 Claims, 9 Drawing Figures

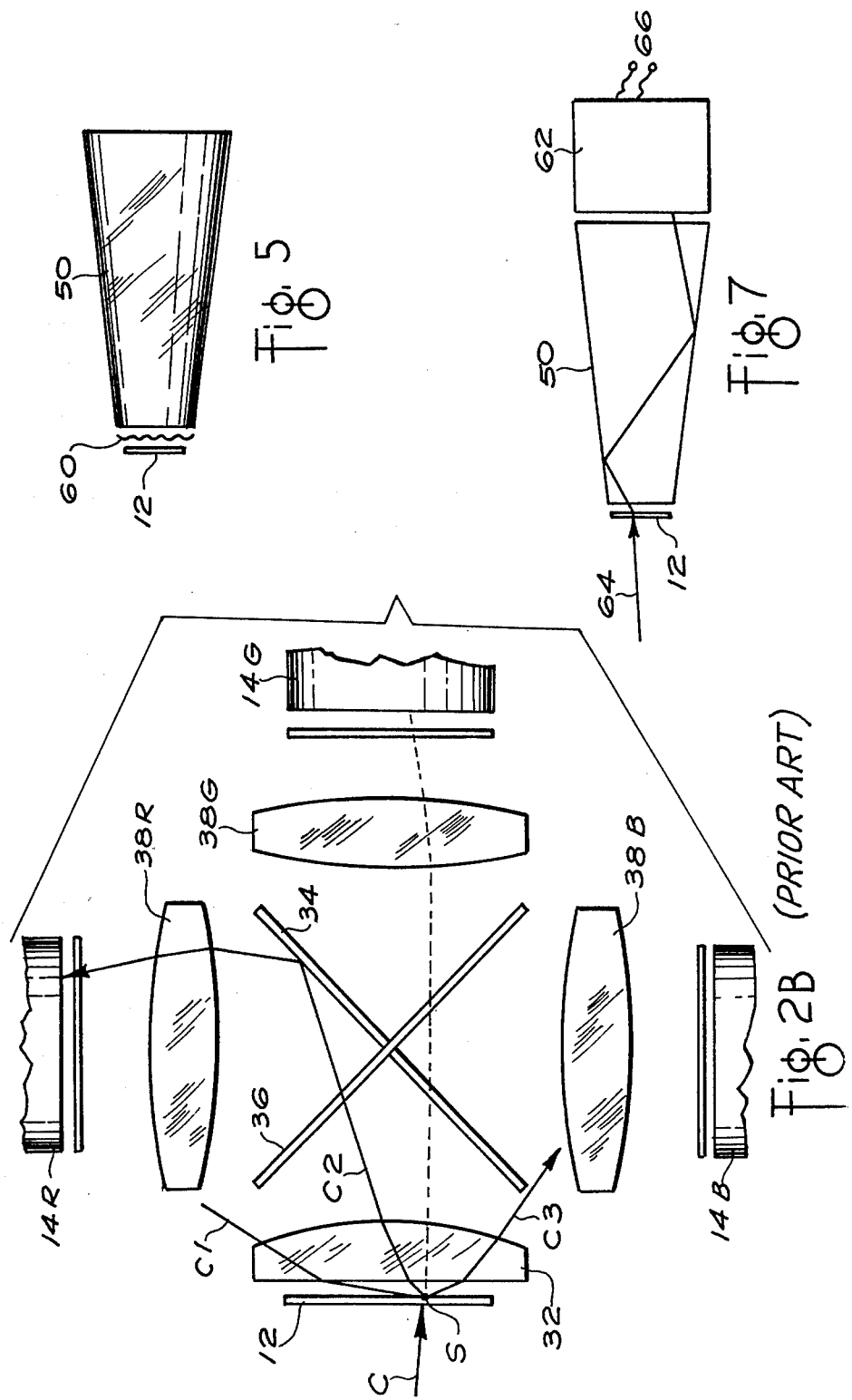

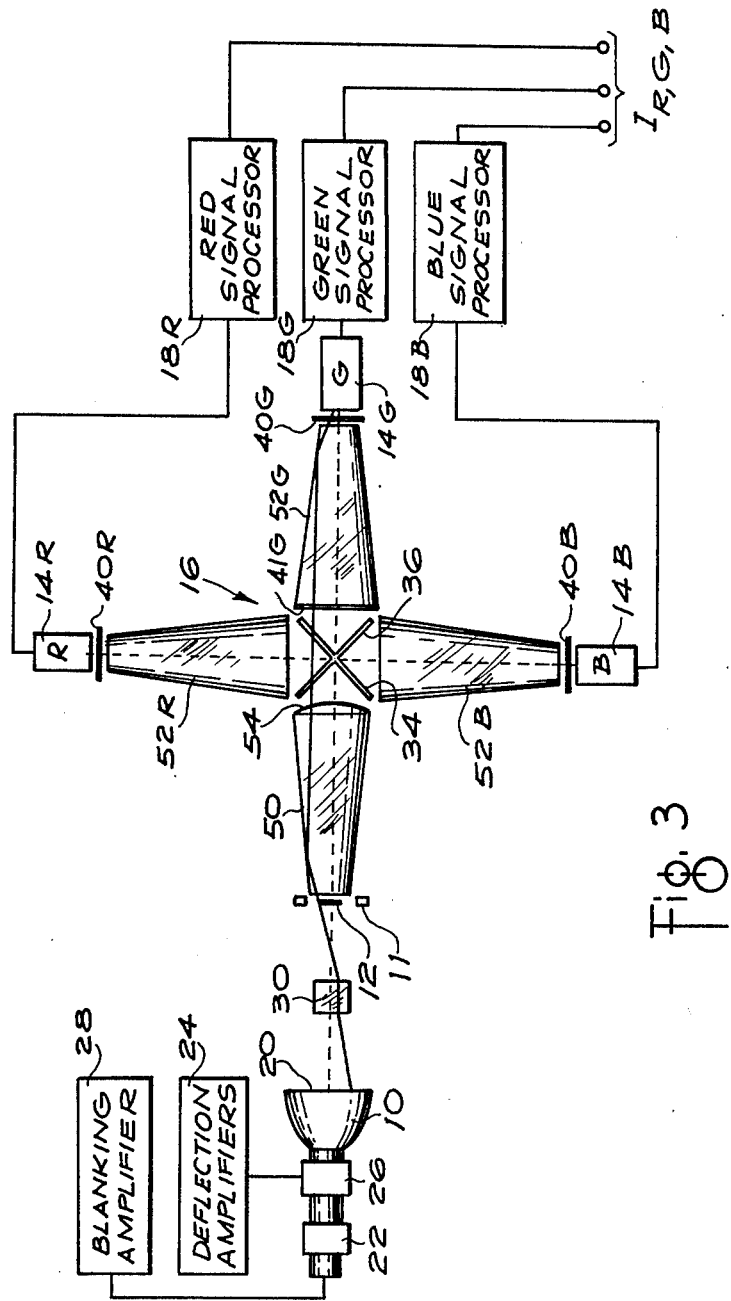

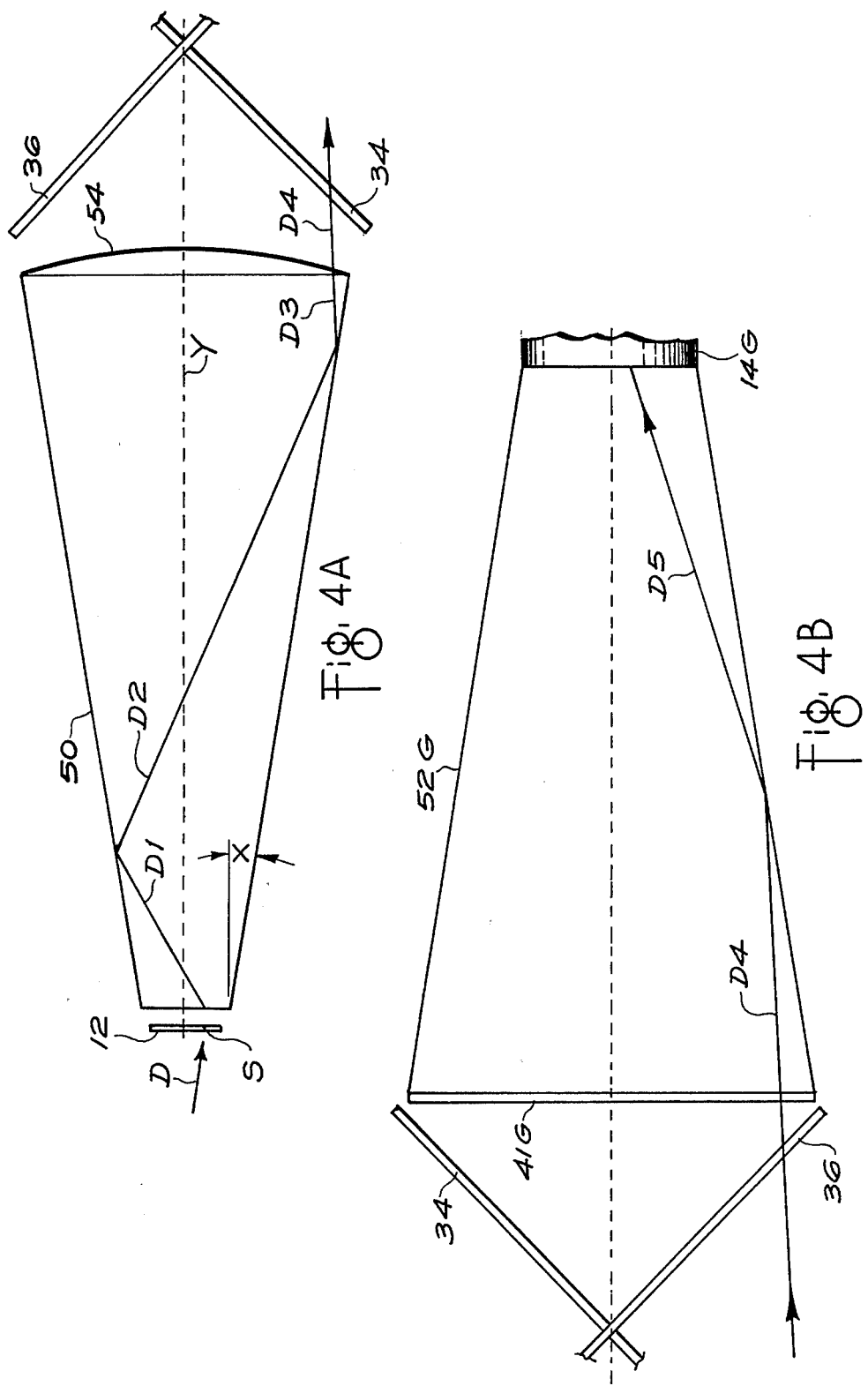

LIGHT COLLECTION APPARATUS FOR A SCANNER

BACKGROUND OF THE INVENTION

1. Field of the Invention

The invention generally relates to optical scanning apparatus for collecting the light rays of a scanning beam emerging from a scanned transparency. More specifically the invention relates to apparatus for collecting and separating a polychromatic scanning beam into a plurality of separate beams composed of different wavelengths and, especially, to such optical apparatus having means for suppressing the effect of scratches in the transparency.

2. Description Relative to the Prior Art

In color-separating apparatus for optically separating a beam of polychromatic light, the beam is ordinarily split into several components—red, green and blue—that are directed toward separate photosensitive targets. This is conventionally done by passing the beam through two or more partially reflecting mirrors (often referred to as dichroic mirrors) having optical interference layers with color-selective reflecting and transmitting properties. However, the band of wavelengths reflected by an interference layer is strongly dependent on the effective optical path taken by a ray through the layer as determined mainly by the angle of incidence of the impinging beam relative to the normal. Where two or more interference layers are applied to a mirror, as is frequently the case, the selective reflection effect is further affected by incident angle-shift as the path length is changed in varying degrees in the different layers. In either case, as the incident angle increases further from the normal, the spectral cut of the dichroic filter, i.e., as exemplified by the reflection curve, shifts toward progressively smaller wavelengths.

In addition, with an increasing angle of incidence, an undesirable polarization phenomenon occurs due to asymmetry in the response of the electric vector characterizing the light beam. The electric vector for each wavetrain in the light beam can be resolved into two components, one perpendicular to the plane of incidence (the perpendicular component) and one lying in this plane (the parallel component). With increasing angle of incidence the coefficient of reflection becomes greater for the perpendicular component and smaller for the parallel component, meaning that the perpendicular component is preferentially reflected. As a result the mean reflection caused by both components is color-shifted as the angle of incidence is increased. In the case of either effective optical path shift or polarization effect, undesirable color shifts occur across the images formed upon the photosensitive targets. These problems are discussed in greater detail in several journal articles: P. M. van Alphen, "Applications of the Interference of Light in Thin Films," *Philips Technical Review* vol. 19, 59–67, 1957/58; H. de Lang and G. Bouwhuis, "Color Separation in Colour-Television Cameras," *Philips Technical Review* vol. 24, 263–271, 1962/63; or R. L. Seddon, "Interference Filters for Colorimetric Applications," *Optical Coatings*, vol. 50, 153–162, 1974.

Apart from their use in dichroic filters, interference layers are used to form filters that provide narrowband radiation detection. As an example, radiation reconnaissance systems having a wide field of view include interference filters to provide sharp cut-on or cut-off for narrowband detection, e.g., to detect a particular type of laser beam illuminating the reconnaissance system. Optical arrangements have been suggested for accepting a wide field of rays and reducing their impingement angle upon the interference filter (see, for example, the combination of a hyperhemispherical lens and a fresnel lens described in U.S. Pat. No. 3,761,184 or the optical cone-like condenser described in U.S. Pat. No. 4,225,782).

In view of these well known problems with interference layers, a number of optical designs have been proposed to control polarization and angle shift characteristics in color scanners. For example, in using a flying spot scanner to form a raster scan upon a transparency, at least one condenser lens is usually inserted in the optical path to refract the beams emanating from points outside the middle of the raster towards the axis of the system. This is done in such a way that the axes of most beams reach the dichroic mirrors at a similar angle irrespective of their point of origin on the raster (see H. van Ginkel, "Flying-Spot Scanners for Colour Television" *Philips Technical Review*, vol. 21, 1959/60, pp. 234–250). Another optical design is based on the Philips color-separating prism system described in the above-cited de Lang and Bouwhuis article in the *Philips Technical Review*. This prism system utilizes a compact combination of interference layers cemented between faces of prisms and small air gaps between selected sets of prisms. The Philips optical geometry in combination with glass prisms allows the angles of incidence to be reduced over what can be obtained with conventional open air plate type color separation systems.

However neither the condenser lens nor the prism system are sufficiently effective regarding widely diverging rays. Particularly in the case of a transparency, light-scattering artifacts (such as scratches, dust particles, and the like) are common sources of widely diverging rays. A typical artifact is a scratch on the transparency which scatters light from a scanning beam. Oftentimes, some of the scattered light will be at such an extreme angle that it will not be collected at all by the light collection apparatus. In these cases, the signal to the photosensitive targets will be less than that for areas immediately adjacent to the scratch that contain the same scene detail. Where a reproduction is made from such target signals, the scratch will be readily visible because of the decreased signal. In the case of transparency scanners it has been suggested to surround the optical system with reflecting surfaces to redirect light scattered by scratches back upon the photosensitive targets to obscure the effect of scratches in the transparency.

Other less extremely angled rays of scattered light may enter the light collection apparatus but still at a sharply increased angle of incidence relative to the interference layers. Since the reflection characteristics of the interference layers are modified by angle-shift effects, some rays of the scratch-scattered beam are deflected toward incorrect targets. In the case of color reproductions, the scratch then appears in a different color from the adjacent areas. The reflector-encased design suggested above does not inherently control angle-shift, therefore leading to the appearance of color-shifted scratches even though proper neutral exposure may be achieved for the area of the reproduction corresponding to the scratched area of the transparency.

Illumination of the transparency with strongly diffuse light transmitted by a diffuser would help to suppress the effect of scratches in the transparency. However, because it would fail to provide adequate color separation and lead to a serious reduction in signal-to-noise ratio for the targets, it is basically impractical where a specular scanning source is required. Another method has been to use a "liquid gate" in which the transparency faces are coated with a liquid layer which smoothes out the surface and renders dirt and scratches much less visible. However, the attendant mechanical and operational problems of a "liquid gate" limit its practical applications. In yet another approach, United Kingdom Patent Specification No. 1409153 describes the procedure of detecting light scattered from blemishes on cine film in order to electrically substitute a grey level or adjacent picture signal for the scanning signal obtained from the blemished area. Besides the circuit complexity of implementing such a procedure, the blemished area is incorrectly reproduced relative its original color and density.

SUMMARY OF THE INVENTION

In accordance with the invention means are provided for generating a beam for scanning a transparency, which is supported relative an optical axis in the path of the scanning beam, whereby the direction of the emerging beam varies with respect to the optical axis. Means are provided to effect relative movement of the beam across at least one dimension of the transparency. An optical element is positioned relative the optical path adjacent the transparency to collect the light beam emerging from the transparency and transmit at least a portion of the beam by means of internal reflection within the optical element. Such an optical element may be tapered and therefore have large and small apertures at opposite ends thereof, with its smaller aperture positioned near the transparency.

The invention has particular utility for collecting light emerging from a scanned area of a transparency having a light-scattering artifact thereon. The transparency is supported in the scanning light beam whereby the beam emerging from the transparency is scattered by the artifact. The tapered optical element is positioned adjacent the transparency to collect a substantial portion of the scattered light at its smaller input aperture and substantially reduce the divergence of the scattered beam at the output end of the element.

In a preferred embodiment, a color transparency is scanned by a polychromatic beam. Means are provided for separating the polychromatic beam emerging from the transparency into a plurality of spectral components. The tapered optical element is interposed between the transparency and the spectral separating means for reducing the angular divergence of the beam of light passing to the spectral separating means.

BRIEF DESCRIPTION OF THE DRAWINGS

A preferred embodiment of the invention will be described with reference to the drawings, wherein:

FIGS. 2A and 2B are ray diagrams of typical light paths of light beams passing through a transparency without hindrance and scattering from a scratch on a transparency, respectively;

FIG. 3 is a block diagram illustrating the optical design of a flying spot scanner incorporating a light collecting and color separating apparatus in accordance with the invention;

FIGS. 4A and 4B are enlarged diagrams of the light collecting and color separating apparatus of FIG. 3 showing also a ray diagram of a typical path of a light ray scattered from a scratch on the transparency and through tapered bars in accordance with the invention;

FIG. 5 is a diagram of one of the tapered bars incorporating a high gain light diffusion filter on one end thereof;

FIG. 7 is a further embodiment of the invention for use without a beamsplitter.

DESCRIPTION OF THE PREFERRED EMBODIMENT

Since optical scanners are well known in which transparent material such as slides, negatives or movie film is scanned, the present description will be directed in particular to elements forming part of, or cooperating more directly with, the present invention. Optical scanner elements not specifically shown or described herein may be selected from those known in the art. Scanning equipment with such elements includes graphic arts scanners, telecine and slide scanning apparatus, as well as photographic printers. Since the invention has particular utility with the optical scanning of color transparencies, the description will be directed to this application. However, the invention may be used with color or black and white transparencies, positive or negative transparencies, or transparencies in separate "still" form or joined together as motion picture film. Moreover, apparatus in accordance with the invention is useful wherever it is desirable to reduce the incident angle of a beam of light—whether or not polychromatic—relative a receiving surface. Furthermore, the source of the scanning beam is clearly a matter of choice. For illustrative purposes only, the invention is described in terms of a beam generated by a cathode ray tube flying spot scanner. Other scanning beams generated from, for example, a laser or a solid state light source are suitable for use with the invention.

Figure 1:
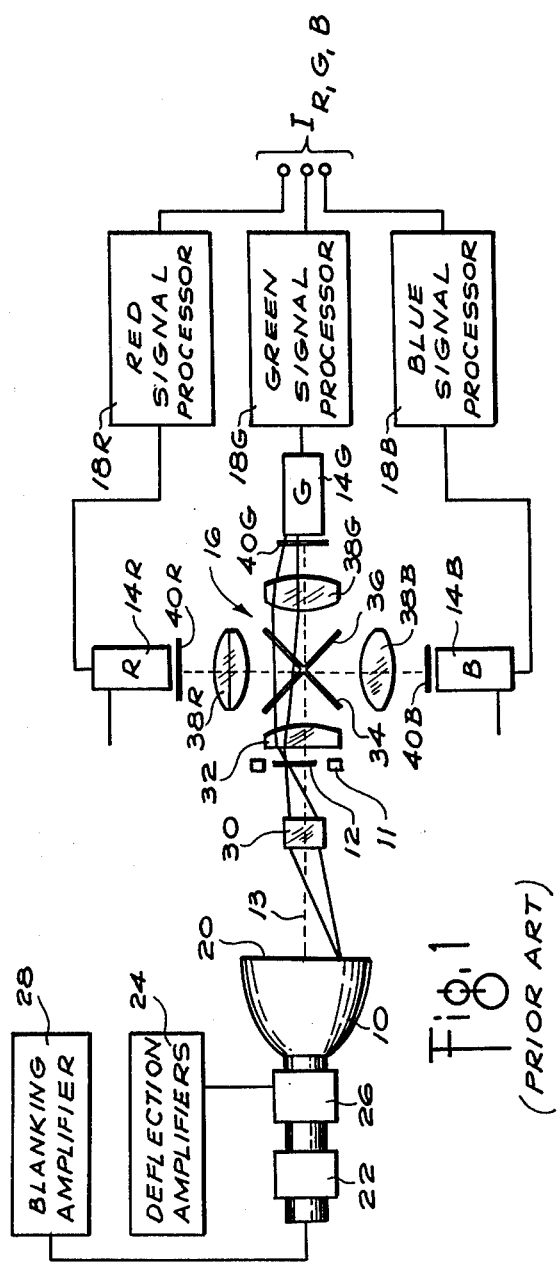
FIG. 1 is a block diagram illustrating the optical design of a flying spot transparency scanner known in the prior art.

Referring to FIG. 1, a conventional flying spot scanner is illustrated using a conventional combination of crossed dichroic beamsplitting mirrors and beam converging condenser lenses. A uniformly bright scanning raster is produced by exciting phosphors on a cathode ray tube 10. The raster is imaged upon a transparency 12 positioned in a film gate 11 on the optical axis 13 of the scanner apparatus. (An exemplary transparency for such a system is a photographic film transparency, either a color negative or positive.) The modulated light emerging from the transparency 12 is directed upon three photoelectric cells 14R, 14G and 14B, for red, green and blue light respectively, via beamsplitting apparatus generally depicted by the reference character 16. The photoelectric cells may be conventional photocells, phototubes, solid state receptors, or the like. The resultant output, after amplification and suitable processing in processors 18R, 18G and 18B, constitutes the image signal I. With this scanning arrangement, illumination of each elementary area of the transparency occurs only at the moment of scanning and for a short period immediately afterward during which emission from the phosphor persists.

In order to get a sharply focused spot on the faceplate of the scanning tube 10, the electron beam generated within is converged toward the phosphor screen 20 by a magnetic field generated by a focusing coil 22. The horizontal and vertical sweeping of the beam is provided by horizontal and vertical waveforms generated in deflection amplifiers 24 and applied to a deflection coil 26. The electron beam is suppressed during the flyback period by a blanking amplifier 28. To be satisfactory for color rendition of a photographic film transparency, a suitably doped phosphor is incorporated into the phosphor screen to generate emissions in the desired portions of the spectrum. While selected for a short afterglow, phosphors continue to emit light for some time after their excitation thereby affecting the electrical response of the signals obtained from the photocells 14R, 14G and 14B. Suitable equalization is therefore provided in the processors 18R, 18G and 18B to compensate for the effects of phosphor afterglow.

A conical scanning beam is formed by an objective lens 30 from the scanning spot of light on the faceplate 20 of the scanning tube 10. The scanning beam is imaged to a spot upon a small area of the transparency 12. The intensity of the beam emerging from the other side of the transparency 12 depends upon the optical density of each small area of the transparency interposed in the path of the scanning beam, i.e., the optical density of each small area modulates the intensity of the beam. A condenser lens 32 refracts the modulated beam emanating from points away from the middle of the raster toward the axis of the beamsplitting arrangement 16 so that the beam reaches the beamsplitter at a reduced angle relative the optical axis 13. A pair of dichroic mirrors 34 and 36 arranged in cruciform position constitute the beamsplitter. Each mirror includes one or more interference layers for selectively reflecting and transmitting portions of the spectrum. The mirror 34 reflects the red component of the beam to the red photocell 14R while transmitting the blue and green components. The mirror 36 reflects the blue component of the beam to the blue photocell 14B while transmitting the red and green components. The green component of the beam is passed through both mirrors to the green photocell 14G.

The condenser lens 32 cooperates with a set of condenser lenses 38R, 38G and 38B to form an image of the exit pupil of the objective lens 30 at the plane of the photosensitive surfaces of respective photocells 14R, 14G and 14B. The red, green and blue beams are ordinarily passed through respective color trimming filters 40R, 40G, and 40B to improve the spectral characteristics of each color channel. The electrical signals generated by the photocells 14R, 14G and 14B are applied to the processors 18R, 18G and 18B, which typically comprise a set of video amplifiers, for the aforementioned afterglow correction and for a contrast correction to render correct tone reproduction (gamma correction). The processed red, green and blue signals $I_{R,G,B}$ are then available for use in a variety of imaging processes.

Figure 2A:
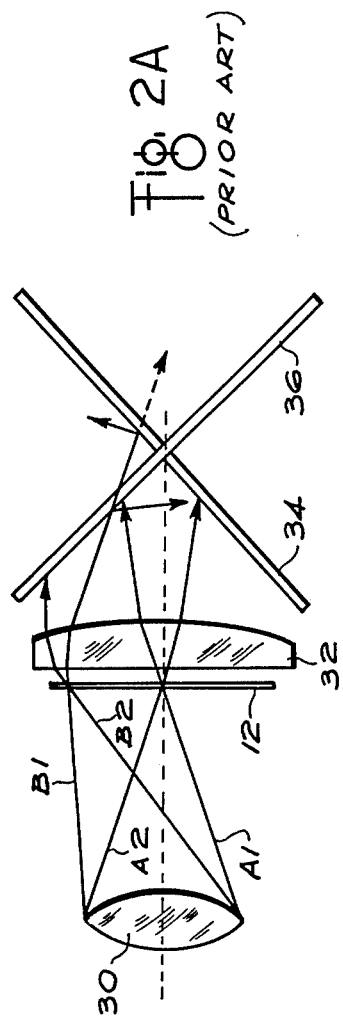

FIGS. 2A and 2B illustrate respective disadvantages of the system of FIG. 1 when scanning a transparency, especially at its periphery, and when scanning over a scratch, blemish or other artifact on the transparency. Referring first to FIG. 2A, light rays A1 and A2 (generated by the flying spot scanning tube 20, shown in FIG. 1, and focused by the objective lens 30) represent the extreme rays of a beam striking the central portion of the transparency 12. Light rays B1 and B2 represent the extreme rays of a beam striking a peripheral portion of the transparency 12. Each beam is refracted by the condenser lens 32 and directed toward the crossed dichroic mirrors 34 and 36.

Each dichroic filter is designed to provide optimum spectral separation of a predetermined narrow-band spectral component for a specified incident angle relative to the normal, i.e., in this case a design angle of 45° relative the normal. However, as hereinbefore explained, the transmission (and reflection) characteristic of dichroic filters is strongly affected by incident angle shift, i.e., as the incidence angle increases(decreases) relative the normal, the spectral cut of a dichroic filter shifts toward progressively smaller(larger) wavelengths. While any angle shift is detrimental, dichroic mirrors arranged at 45° will ordinarily tolerate a small shift before the band edge characteristics change so substantially as to grossly affect the desired spectral separation. For example, if the objective lens 30 operates at F/4 the rays A1 and A2 will converge toward the transparency 12 at $\pm 7°$. Although the transmission passband of the mirror 36 and the mirror 34 will be affected as the incidence angle varies from the design angle, such a small shift is customarily tolerated despite its contribution of color shading problems.

However, unlike rays A1 and A2, extreme ray B1 strikes (1) the blue reflecting dichroic mirror 36 at an angle significantly greater than the design angle of 45° and (2) the red reflecting mirror 34 at an angle significantly less than 45°. This introduces unwanted polarization shifts and respectively increases(decreases) the optical path(s) through the dichroic mirror 36(34) and shifts the cutoff wavelength of the reflection passband toward smaller(larger) wavelengths. For angles greater than the design angle, the blue reflecting mirror 36 cuts off at shorter wavelengths of nominally blue light, permitting some longer wavelength blue light to transmit and eventually reach the green photocell 14G. Moreover, the reflection band of the red reflecting mirror 34 now shifts toward longer wavelength red light thus permitting some shorter wavelength red light to pass through to the green photocell 14G. This leads to an undesirable color shading of the output signal for affected wavelengths of rays derived from the periphery of the transparency, i.e., portions of the image will be incorrectly colored if a colored copy is made from the output signals.

Referring now to FIG. 2B, a scratch S located on the transparency 12 has irregular surfaces that refract and scatter light over a wide angular range. Some of the light escapes from the optical system and is not collected by the condenser lenses 32, 38R, 38G or 38B so that the resultant signal to the photocells 14R, 14G or 14B will be less than that for areas immediately adjacent to the scratch that contain the same scene detail. Then, for example, the scratch will be readily visible in a color copy because of the decreased signal. The scratch may also appear on, for example, a color copy in a different color from the adjacent areas because of the changed angle of incidence relative to the dichroic mirrors 34 and 36 that accompanies the collection of some of the scattered light.

Incident beam C is exemplary of a green component of a beam that, but for the scratch S, would strike the dichroic mirrors 34 and 36 substantially at the designed incidence angle of 45° and transmit (as shown by broken line) to the photocell 14G. (Red and blue components of a beam may be similarly analyzed with respect to photocells 14R and 14B.) However the scratch S scatters the light beam C into a wide angular field. Rays C1 and C3 are exemplary of the light scattered entirely away from the dichroic mirrors 34 and 36. Depending on the arrangement of the beamsplitting apparatus (particularly regarding baffles and other light blocking elements), the ray C1 is not collected by any of the condenser lenses 38R, 38G and 38B and therefore results in a signal loss for the corresponding area on the transparency. The ray C3 is collected by the condenser lens 38B without intercepting the dichroic mirrors 34 and 36 and therefore produces a false color signal for the scratched area on the transparency. A ray C2 is intercepted by the dichroic mirror 34 but at an incident angle significantly greater (with respect to the normal) than intended by the design. Consequently, the greater angle shifts the spectral cut of the red-reflecting band of the mirror 36 toward shorter wavelengths reaching into the green component of the spectrum and causes the reflection of a portion of the green light to the red photocell 14R. The result is a false color signal from the corresponding scratched area of the transparency leading to undesirable color shading for that area in a copy made from the output signals from the photocells.

These problems are particularly critical in the green channel since the bandwidth of the light reaching the photocell 14G is ordinarily determined by the cutoffs of the reflection curves of the interference layers of both mirrors 34 and 36, i.e., angle shifts can affect the green bandwidth at each side of its passband. While FIGS. 2A and 2B have been discussed in connection with such particular bands of wavelengths, i.e., green, it should be clear that many other bands, or combinations of bands, of wavelengths will produce similar unwanted reflections and, in some cases, unwanted transmissions.

FIG. 3 is a diagram of a flying spot scanner incorporating a beamsplitting and light collection apparatus in accordance with the invention. Elements having the same reference numbers as in FIG. 1 have similar functions in FIG. 3. The flying spot on the face plate 20 of the scanner tube 10 is imaged by the objective lens 30 upon the transparency 12 positioned in the gate 11. A tapered bar 50 is positioned in close proximity to the surface of the transparency. A 1-3 mm spacing therebetween has been found suitable. Sometimes referred to as an integrating bar, the tapered bar 50 has the property of total internal reflection for a light ray entering its entrance aperture. It is formed of a relatively light-transparent material, for example, glass or a suitable plastic such as Plexiglas TM acrylic plastic. (Glass is preferable as it is more optically homogeneous than plastic.) Substantially all light emerging from the transparency 12 is captured by the entrance aperture of the tapered bar 50 and is transmitted either directly or by total internal reflection to the exit aperture of the bar 50. While the tapered bar 50 may have a substantially planar exit aperture surface, it has been found useful to have the exit aperture rendered convex to act as a condenser lens 54, which serves to further collimate the light diverging from the spot focused on the transparency 12. The light exiting the tapered bar 50 is split into three spectral components by the crossed dichroic mirrors 34 and 36 and collected by the tapered bars 52R, 52G and 52B to strike the respective photocells 14R, 14G and 14B. The tapered bars 52R, 52G and 52B permit total internal reflection and are formed in a manner similar to the tapered bar 50.

Depending on the taper ratio, i.e., the ratio of the diameters (or like dimensions) of the exit aperture and entrance aperture faces, collimation or decollimation can be effected with a tapered bar. For example, a light beam entering the small end of a 3:1 taper at a 40° angle with respect to the optical axis will emerge from the large end within 12° of the optical axis (see discussion and data in S. E. Glazer, "Taper Measurement Techniques," *Proc. of the Soc. of Photo-Optical Instrumentation Engineers*, Vol. 31, 1972, pp. 13–22). The desired effect is obtained by internal reflection upon a surface inclining away from the optical axis. The condenser lens 54 formed at the exit aperture of the tapered bar 50 is useful for increasing collimation relative a given taper ratio but it is unessential in the practice of the invention.

As better seen in FIG. 4A with respect to a ray diagram, the taper half angle X of the bar 50 and the power of its condenser lens 54 are chosen to collimate or at least reduce the angular spread of the light accepted by the entrance aperture such that all the light exiting the bar and striking the dichroic filters is contained within a narrower angular range. With each internal reflection the angle which a light ray makes with the longitudinal axis Y of the bar 50 decreases by 2X°. As depicted in FIG. 4A, an incoming beam D strikes a light-scattering artifact (such as a scratch S, a particle of dust, or the like) on the transparency 12 and scatters a ray D1 into the entrance aperture of the bar 50, becoming then a refracted ray D1 that reflects as ray D2. Thus the angle which ray D2 makes with the longitudinal axis Y of the bar 50 is 2X° less than the angle which ray D1 makes therewith. The finally reflected ray D3 makes an angle with respect to the longitudinal axis Y that is 2nX° less than the angle which ray D1 makes therewith, where n is the total number of reflections (n=2 in this illustration). The output ray is then further refracted by the condenser lens formed on the end of the bar 50.

The emergent ray D4 is therefore incident upon the dichroic mirrors 34 and 36 within a relatively small angular spread very near the design angle of 45°. To study the collimating power of a tapered bar, the narrowed angular spread was simulated by means of a pair of computer ray trace analyses. For both analyses, the rays emerging from a tapered bar were simulated for light (entering the bar) that originates at a point source located on the axis of the bar and 1.0 mm from its first surface, i.e., on the surface of a hypothetical transparency. The bar used was 285 mm in length and had an entrance face of 16×21 mm and an exit face of 62×78 mm with a condenser lens formed thereon. In the first analysis, light emanating from the point source on the transparency was assumed to be uniformly distributed over the angular range of ±7° to simulate a cone of focused specular light from an F/4 lens emerging from a substantially blemish-free area of the transparency. A ray emerging from the tapered bar was found to be substantially collimated. In the second analysis, light emanating from the point source on the transparency was assumed to be uniformly distributed over an angular range of ±40° to simulate the effect of diffuse light scatter when a specular scanning beam strikes a scratch or similar blemish on the transparency. In such case, rays emerging from the bar (corresponding to D4 in FIG. 4) were found to be confined to a maximum angular range of ±9.8° relative to the optical axis.

Referring again to FIG. 3, the crossed dichroic mirrors 34 and 36 intercept the beam composed of relatively collimated rays emerging from the tapered bar 50 and separate the beam into red, green and blue spectral components that enter the front aperture surfaces of the tapered collecting bars 52R, 52G and 52B, respectively. Being positioned in reverse with respect to the tapered bar 50, the bars 52R, 52G and 52B converge respective beams of incoming light rays into smaller cross-sectional areas at the smaller exit aperture surfaces of the bars. However, as seen in FIG. 4B, the cross-sectional convergence of the beam is accompanied by an increased angular divergence of the rays as, in the example, the incoming ray D4 is diverted as emergent ray D5 having a greater angular divergence relative to the optical axis of the tapered bar. As in the case of the bar 50—but now observed in reverse—this is due to internal reflections within the bars 52R, 52G and 52B relative to the taper half angles of the bars.

The photosensitive faces of the photocells 14R, 14G and 14B are preferably placed in either physical or optical contact with the exit aperture surfaces of bars 52R, 52G and 52B (with the trimming filters 40R, 40G and 40B positioned therebetween) to intercept the emergent beam. Because the green channel is substantially defined by the red and blue cutoffs of the mirrors 34 and 36, it has been found preferable to place a green transmitting dichroic filter 41G (see FIG. 3) on or near the entrance face of the bar 52G where the light rays are substantially collimated. Such a dichroic filter possesses superior band edge cut off characteristics compared to the usual gelatin filter used for trim filters 40R, 40G and 40B. If dichroic trim filter 41G is used, then the trim filter 40G may be omitted.

The cross-sectional shape or configuration of the tapered bars may be related to the shape of the light originating or receiving elements at either end. If the transparency 12 and the dichroic mirrors 34 and 36 present rectangular surfaces to either end of the prism 50, then similarly the bar 50 may be provided with rectangular end faces. However the cross-sectional shape of the input or small end of the bar 50 could be elliptical, circular or elongated in some other manner depending upon the size and shape of the light-originating area of the transparency 12. The bars 52R, 52G and 52B may have large rectangular input ends to correspond to the surfaces of the dichroic mirrors 34 and 36 while having smaller output ends specially configured to correspond to the shapes of the photosensitive areas of the photocells 14R, 14G and 14B, e.g., a circular end to correspond to a circular photosensitive area. It therefore should be apparent that the respective shapes can be modified to suit a desired arrangement of elements. Moreover, the edge faces of the bars extending longitudinally with respect to the optical axes may be planar, i.e., forming angular corners therebetween, or may be smoothed into a conical form.

For optimum light efficiency, it is desirable to use an appropriately sized bar 50, especially regarding the cross-sectional area of its input end, for differently sized transparencies. This means that, for a given bar length and output cross-sectional area, the taper of the bar 50 increases as the size of the transparency decreases. Table I illustrates this relationship regarding the tapered bar 50 for three common film formats used as transparencies. Also indicated in Table I are the collecting tapered bars 52R, 52G and 52B and their relative specific dichroic and phototube cross-sectional areas.

TABLE I

| Bar | Format | Input Dimension | Length | Output Dimension |
|---|---|---|---|---|
| 50 | 135 | 28 × 40 mm | 285 mm | 62 × 78 mm |
| 50 | 110 | 16 × 21 mm | 285 mm | 62 × 78 mm |
| 50 | 16 | 9 × 11.5 mm | 285 mm | 62 × 78 mm |
| 52R,52G,52B | | 100 × 120 mm | 200 mm | 35 × 35 mm |

A change from one transparency format to another may also involve the adjustment or replacement of the objective lens 30. Moreover, the increased taper for smaller transparency formats has the beneficial effect of improving the degree of collimation obtained for diffuse rays emerging from a scratched area of the transparency. However, the same benefit is obtained for any format by selecting an appropriate input-output dimensional relationship.

The cruciform arrangement of the dichroic mirrors 34 and 36 is helpful in reducing the size of the optical design. However other arrangements are equally possible with the invention. In another typical arrangement, the dichroic mirrors are spaced apart such that one color component is completely separated before the remaining portion of the beam encounters the next dichroic mirror. While the cruciform arrangement is preferred for compactness, the thickness of the glass at the intersection of the crossed dichroic mirrors forms an irregularity which can intercept and absorb or scatter light under certain conditions. Some rays from a specular scanning beam are attenuated when scanned across the irregularity and decrease the output signal corresponding to that area, causing band-like shading in the corresponding area of a copy made from the signal. Moreover, under certain conditions the signals resulting from specular scanning of the corners of a rectangular transparency may be attenuated. It is believed that such attenuation is caused by light escaping from the longitudinal edges (especially if the edges are rounded) of the bar 50 near the entrance aperture when the specular scanning beam scans very close to the corners of the transparency and has a very small cone angle of divergence.

It was found that both of these sources of shading non-uniformity could be eliminated by placing a high gain lenticulated acetate diffuser 60 over the entrance aperture of the bar 50 as shown in FIG. 5 to narrowly extend the divergence of the emergent scanning beam. (The theory, design and fabrication of lenticulated light diffusers having controlled light spread is described by Gerhard Schwesinger in "Experiments with Lenticulated Rear Projection Screens," *Photographic Engineering,* pp. 172–181, vol. 5, No. 3, 1954.) The diffuser 60, having transmission of greater than 85%, was constructed by solvent embossing acetate with a master embossing cylinder to form a surface of small spherical lenticles. The master cylinder may be milled on a precision lathe to form spherical master lenticles having a pitch of 0.001 inch. The surface of an acetate sheet is then softened with acetone and pressed against the master embossing roller to form an image of the metal lenticles in the cylinder. The sheet is cut to proper size and fastened to the entrance aperture end of the bar 50. A goniophotometric analysis showed the maximum emergent light cone from the sheet due to a specular beam to sharply fall off at ±5° essentially lacking a tail component, an angular distribution found to be acceptable. It should also be acceptable to use a fiber optic faceplate having small fiber diameter of, e.g., 20-50 microns, in place of the lenticle-embossed acetate sheet.

It has been suggested that shading non-uniformity may be avoided by constructing the crossed dichlroic mirrors so as to minimize the shading effect caused by the irregularity at the crossover. For example, in the previously cited article by P. M. van Alphen, a form of mirror construction is described in which the cruciform design is split into v-shaped halves joined at a knife edge. The cruciform half that first intercepts the scanning beam is made thicker than the other half. The refraction in the thicker mirrors displaces the beam so far laterally that no light falls on the knife-edge crossover surface and reportedly the shading problem is avoided.

Figure 6:
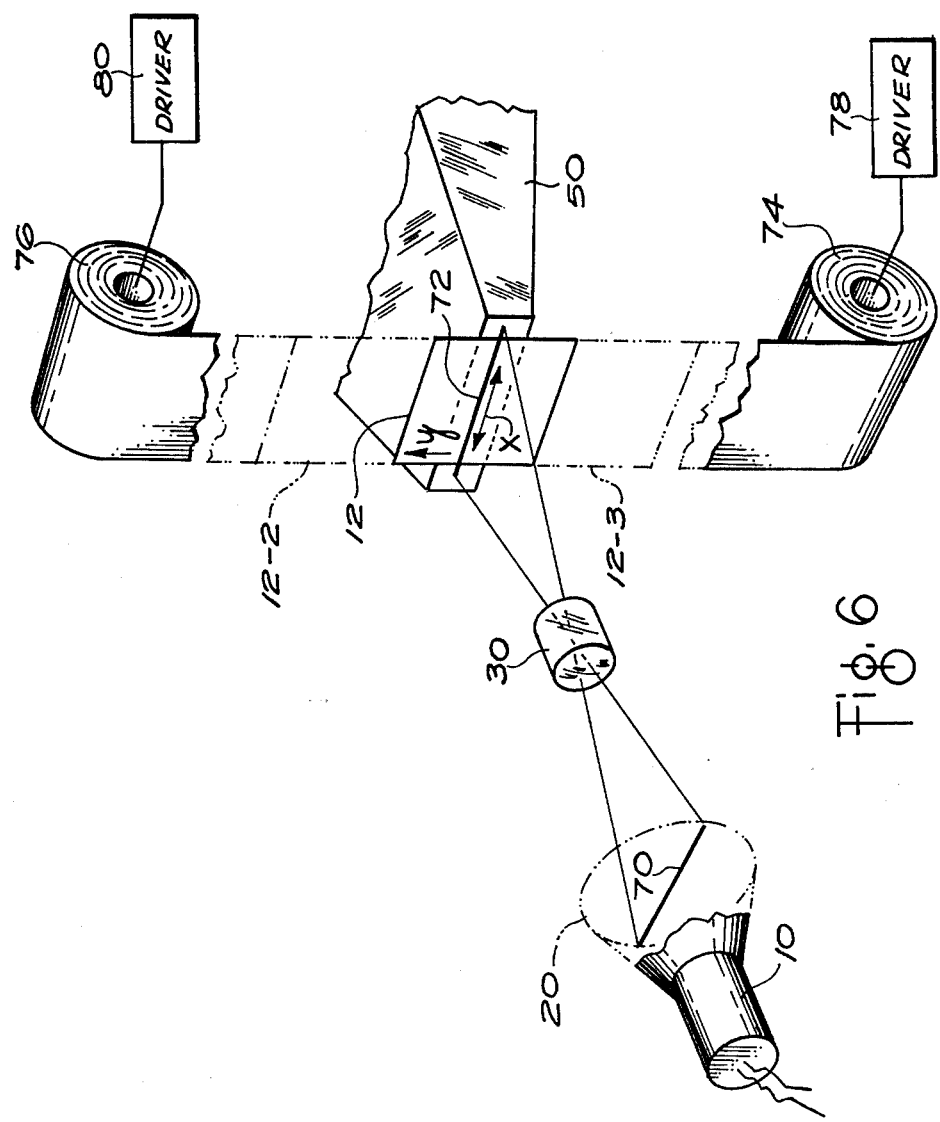
FIG. 6 is an alternative embodiment of the invention useful with apparatus that provides page scan movement of the transparency.

In another embodiment of the invention illustrated in part in perspective in FIG. 6, a two dimensional scan of the transparency 12 is effected by the combination of a lateral x-direction traverse of the scanning beam (line scan) and a vertical y-direction movement of the transparency (page scan). A flying spot on the faceplate 20 of the scanning tube 10 translates laterally back and forth in a path 70 in an x direction only. The spot is imaged by the objective lens 30 upon a horizontal line section 72 of the transparency 12. The y page scan of the transparency may be obtained in a number of ways. The film gate 11 (illustrated in FIG. 3) may be adapted for precise movement in the page direction. More commonly, a number of transparencies may be joined together end-to-end in a web (e.g., transparencies 12-2, 12-3, etc.) and transported from an unwind reel 74 to a takeup reel 76 by suitable transport drivers 78 and 80. The light-collecting bar 50 may in this embodiment be reduced in entrance aperture cross section to capture light emerging and scattered only from the scan line 72. The design of FIG. 6 is particularly adapted for scanning by means of a highly collimated pencil beam of electromagnetic radiation, such as produced by a laser. In the absence of scratches, such a pencil beam will enter the entrance face of the bar 50 on axis or at a small angle relative to the axis and emerge as a collimated beam at or near the design angle of the dichroic mirrors without reflecting off the walls of the tapered bar 50. Optimum color separation results. A scratch will scatter at least some of the light from the pencil beam, thus acting as a source of diffuse illumination that is re-collimated by internal reflection within the tapered bar 50, as discussed in connection with FIGS. 3, 4A and 4B. In practice a set of lasers will provide the necessary components of the color scanning beam, being formed into one composite scanning beam through a set of mirrors and a scanning prism.

While the preferred embodiment has been described in terms of three color scanning involving a beamsplitter, apparatus in accordance with the invention is fully realized as further indicated in FIG. 7 by the combination of a scratch suppressing tapered bar 50 and a photocell 62 near the output aperture of the bar 50. Such an application is suggested where, e.g., a monochromatic beam 64 of light scans the transparent original 12, as in the black and white telecine projector illustrated in the previously cited U.K. patent specification 1409153, and the signal 64 derived from the photocell 62 is sufficiently represented by the monochromatic absorptions of the original 12. The beam 64 may be polychromatic but the photocell sensitivity will mainly depend on its own spectral sensitivity rather than the spectral selectivity of the absorptions in the original 12.

A number of modifications and variations are possible depending on the level of performance desired (or obtained in practice) and the particular arrangement of scanner elements. For example, depending on the attained level of performance relative to the magnitude of the usual blemishes on the transparency, only one light-collecting bar 50 may be sufficient for several transparency formats. Furthermore, one could replace the beam-converging bars 52R, 52G and 52B of FIG. 3 with the condenser lens 38R, 38G and 38B of FIG. 1, thereby retaining much of the scratch suppression advantages of the embodiment of FIG. 3 at the expense of larger photosensitive faces on the photocells 14R, 14G and 14B. In another modification, the length of the bars 52R, 52G and 52B could be reduced by placing condenser lens near or on the entrance apertures of the respective bars. Moreover, the taper of the bars 52R, 52G, and 52B may be optimized for minimum exit aperture depending on whether the respective photocells 14R, 14G and 14B are optically or physically coupled to the exit aperture ends of the bars.

The invention has been described in detail with particular reference to a preferred embodiment thereof and other embodiments and modifications thereto, but it will be understood that further variations and modifications can be effected within the spirit and scope of the invention.

What is claimed:

1. Apparatus for scanning a transparent original with a light beam relative to an optical axis and for collecting the portion of the beam transmitted through said original wherein the direction of the light beam rays emerging from respective areas of the original varies with respect to the optical axis, said apparatus comprising:
   means for generating a light beam;
   means for supporting the transparent original in the path of the beam;
   means for moving the light beam across at least one dimension of the transparent original;
   an elongated tapered optical element having differently sized apertures at opposite ends thereof and a tapered reflecting surface therebetween;
   means for separating at least one spectral component from the light beam; and
   means for supporting said optical element on the optical axis between said original supporting means and said separating means with its smaller aperture adjacent said original supporting means to collect the light beam rays emerging from the transparent original, whereby its tapered surface is oriented to internally reflect at least some of the light beam rays toward the larger aperture such that the direction of the rays emerging from the larger aperture and striking said separating means vary less with respect to the optical axis than the direction of the rays emerging from the transparent original.

2. The apparatus as claimed in claim 1 wherein said tapered optical element comprises a tapered glass bar having a ratio of at least 2:1 between its larger and smaller apertures as measured relative to said at least one scanned dimension of the transparent original.

3. Apparatus for scanning a transparent original which may have light-scattering artifacts on the surface thereof, said apparatus comprising:
   means for generating a light beam formed of substantially focused rays;
   means for supporting the transparent original in the path of the beam;

means for scanning the beam across at least one dimension of the transparent original whereby the rays emerging from an area of the original are either transmitted without substantial scattering or scattered if an artifact is located on the surface of the original in the path of the beam;

means for filtering the light rays emerging from the original; and tapered light collecting means positioned between said original supporting means and said filtering means for collecting both scattered and unscattered light rays and for internally reflecting at least some of such rays therewithin to reduce their angular divergence with respect to each other whereby the scattered rays are redirected more nearly in parallel with the unscattered rays.

4. Apparatus for scanning a transparent original which may have a light-scattering artifact thereon, said apparatus comprising:

means for generating a light beam;

means for supporting the transparent original in the path of the light beam;

means for scanning the light beam across at least one dimension of the transparent original whereby the beam is scattered when it scans across said artifact;

means for filtering the scanning light beam after it emerges from the original;

means for sensing the light modified by said filtering means; and an elongated tapered optical element having large and small apertures at opposite ends thereof, the element being interposed between said supporting means and said filtering means with its small aperture disposed to collect a substantial portion of the scattered light from the transparent original and redirect it by internal reflection toward its large aperture and therefrom to said filtering means.

5. Apparatus for scanning a transparent original which may have a light-scattering artifact thereon and for collecting the light scattered from the artifact, said apparatus comprising:

means for generating a light beam for scanning the transparent original;

means for supporting the transparent original in the path of the beam;

a filter for separating at least one spectral component out of the light beam, the band-edge characteristic of said spectral component being affected by the angle the impinging beam makes with said filter; and a tapered optical element having an elongated surface and an input aperture and a larger output aperture at opposite ends thereof, the element being positioned with its output aperture adjacent said filter and its input aperture adjacent said original supporting means for collecting a substantial portion of the scattered light emerging from the original, said element being so tapered that at least some of said scattered light may internally reflect from the elongated surface to substantially reduce the magnitude of the angular divergence of the scattered beam upon said filter.

6. Apparatus for scanning a color transparency with a scanning light beam relative to an optical axis and for collecting the portion of the beam transmitted through said transparency wherein the angle of the scanning beam rays emerging from respective areas of the transparency varies with respect to the optical axis; said apparatus comprising:

means for generating a polychromatic beam;

means for supporting the transparency relative the optical axis in the path of the beam;

means for effecting relative movement of the beam across at least one dimension of the color transparency;

means for separating the polychromatic emerging beam into a plurality of spectral component beams each confined to a particular spectral band, the band-edge characteristic of each component beam being dependent upon the angle the polychromatic beam makes with said separating means; and an elongated tapered optical element interposed between said transparency supporting means and said spectral separating means for directing the scanning beam rays emerging from the transparency to said spectral separating means and for reducing the angular variation of the scanning beam rays relative the optical axis.

7. Apparatus for scanning a color transparency with a scanning beam relative to an optical axis, whereby the beam emerging from respective areas of the transparency is modified in accordance with the color density of such areas; said apparatus comprising:

means for generating a polychromatic light beam;

means for supporting the transparency relative the optical axis in the path of the beam;

means for sweeping the light beam across at least one dimension of the transparent original to cause the beam emerging from the transparency to periodically diverge from the optical axis;

dichroic mirror means having at least on interference layer for separating the modified beam of light into at least one spectral component beam; and an elongated tapered optical element interposed between said transparency supporting means and said dichroic mirror means with the small part of its taper oriented toward said supporting means for collecting the beam emerging from the transparency and directing it to said dichroic mirror means while reducing any divergence of the beam relative the optical axis.

8. Apparatus for scanning a color transparency which may have a light-scattering artifact thereon and for collecting the light scattered from the artifact, said apparatus comprising:

means for generating a polychromatic light beam;

means for supporting the transparency relative the optical axis in the path of the beam;

means for sweeping the light beam across at least one dimension of the transparency whereby the beam is scattered when it sweeps across said artifact;

a beamsplitter having at least one interference layer for separating the emerging scattered light beam into a plurality of component beams of predetermined separate spectral bandwidths, the bandwidths of the component beams being dependent upon the angle the scattered light beam makes with the interference layer; and an elongated tapered optical element interposed between said transparency supporting means and said beamsplitter for directing the scattered light beam emerging from the transparency to said beamsplitter while reducing the angular divergence of the scattered light beam upon said interference layer.

9. The apparatus as claimed in claim 8 in which said elongated optical element includes small and large apertures respectively adjacent said transparency supporting means and said beamsplitter, a high gain diffuser positioned adjacent the small aperture, and a condenser lens formed upon the large aperture to further reduce the divergence of the beam relative the optical axis.

10. Optical apparatus for collecting light transmitted area by area through a transparency over a wide angular range relative an optical axis, and for filtering the light for a predetermined narrowband spectral component, said apparatus comprising:
   means for supporting the transparency relative the optical axis;
   an interference filter oriented at a selected angle relative the optical axis and disposed to transmit the predetermined spectral component for light impinging at the selected angle; and
   an elongated tapered optical member interposed between said supporting means and said interference filter to collect the transmitted light emerging from the transparency and to reduce, by internal reflection therewithin, its angular divergence relative the optical axis, whereby the light approaches said interference filter at a reduced angular range relative the selected angle to provide improved spectral filtering of the light.

11. Apparatus for collecting light scattered from a scratched area of a color transparency over a wide angular range relative an optical axis and for separating the light into spectral components, said apparatus comprising:
   means for supporting the transparency relative the optical axis;
   a color dichroic mirror oriented at a selected angle relative the optical axis and disposed to reflect one spectral component and transmit another spectral component for light impinging at the selected angle; and
   an elongated tapered solid optical member interposed between said supporting means and said dichroic mirror to collect the scattered light emerging from the transparency and to reduce, by internal reflection therewithin, its angular divergence relative the optical axis, whereby the light approaches said color dichroic mirror at a reduced angular range relative the selected angle to provide improved spectral separation of scratch-scattered light.

12. Apparatus for scanning a color transparency which may have a light-scattering artifact thereon and for directing the light scattered by the artifact toward separate photosensors sensitive to respective color densities of the area covered by the artifact, said apparatus comprising:
   means for generating a polychromatic light beam;
   means for supporting the transparency in the path of the beam;
   a beamsplitter having at least one interference layer for separating the light beam emerging from the transparency into a plurality of component beams that correspond spectrally to the sensitivity of the separate photosensors, said interference layer providing the correct spectral separation for a particular photosensor when the angle the light beam makes with the layer is confined to a predetermined angular range;
   means for supporting the beamsplitter in the path of the beam such that said path intersects said interference layer at an oblique angle;
   means for sweeping the light beam across at least one dimension of the transparency whereby the beam is scattered over a wide angular range when it sweeps across said artifact; and
   an elongated tapered optical element interposed between said transparency supporting means and said beamsplitter for collecting the scattered light emerging from the transparency and confining the angular range of the scattered light to a range within the predetermined angular range of said interference layer.

13. The apparatus as claimed in claim 12 in which said oblique angle at which the beamsplitter is supported in the path of beam is approximately 45° relative to the normal of said interference layer.

* * * * *